United States Patent [19]

Wait

[11] E Re. 28,846

[45] Reissued June 8, 1976

[54] COLLAPSIBLE PALLET BOX

[75] Inventor: Hershey L. Wait, Lake Zurich, Ill.

[73] Assignee: Rockaway Corporation, Rockaway, N.J.

[22] Filed: Mar. 14, 1974

[21] Appl. No.: 451,307

Related U.S. Patent Documents

Reissue of:

[64] Patent No.: 3,459,321
Issued: Aug. 5, 1969
Appl. No.: 719,913
Filed: Apr. 9, 1968

U.S. Applications:

[63] Continuation of Ser. No. 163,511, July 16, 1971, abandoned.

[52] U.S. Cl. ..... 217/16; 217/43 R; 217/65

[51] Int. Cl.[2] ..... B65D 9/18

[58] Field of Search ..... 217/12, 16, 43 R, 48, 217/43 A, 65

[56] References Cited

UNITED STATES PATENTS

| | | | |
|---|---|---|---|
| 2,042,323 | 5/1936 | Ott | 217/16 |
| 2,042,329 | 5/1936 | Bigelow | 217/16 |
| 2,042,339 | 5/1936 | Henderson | 217/16 |
| 2,808,956 | 10/1957 | Johnson | 217/48 |
| 3,159,300 | 12/1964 | Coffey | 217/65 |
| 3,262,597 | 7/1966 | Coffey | 217/12 |

*Primary Examiner*—George E. Lowrance
*Attorney, Agent, or Firm*—Pasquale A. Razzano

[57] ABSTRACT

A collapsible pallet box having four sidewalls each in lapped relationship with the ends of the adjacent sidewalls when the box is erected. The sidewalls have aligned horizontal cleats, and the cleats have aligned channels carrying an endless strap running around the periphery of the box. The strap is slidable in the channel, and the cleats, are designed so that the strap is tight both when the box is erected and when it is collapsed.

13 Claims, 5 Drawing Figures

Fig. 1.
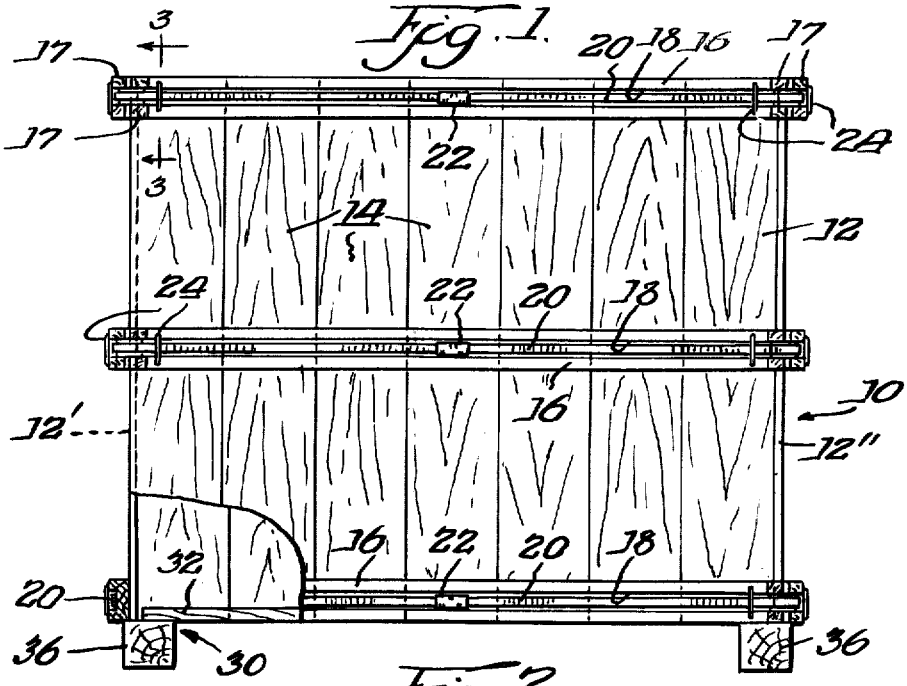
Fig. 3.
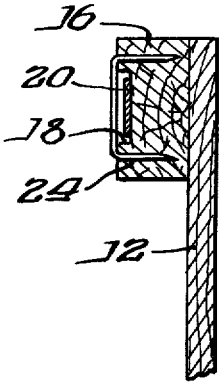
Fig. 2.
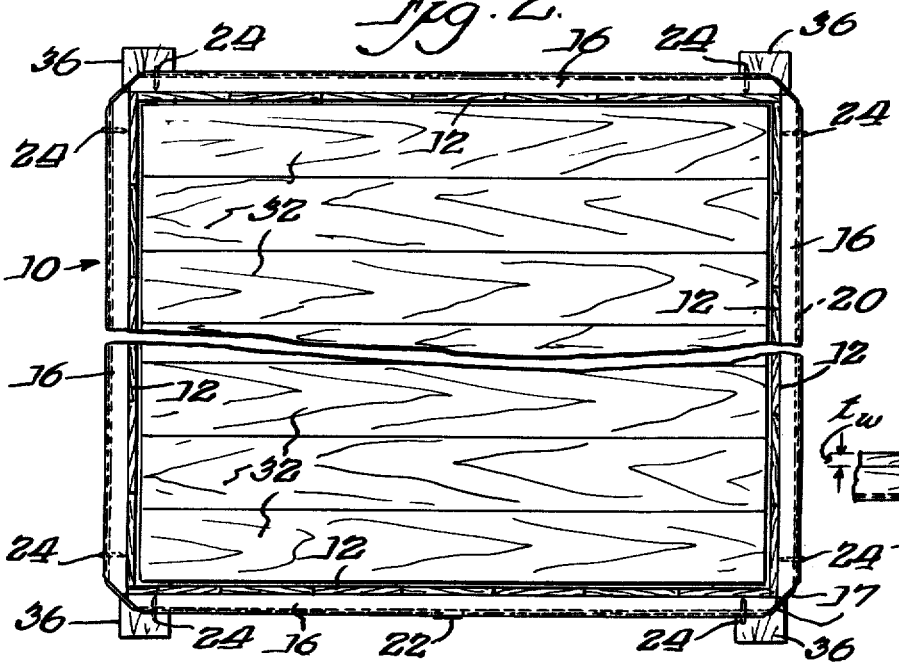
Fig. 5.
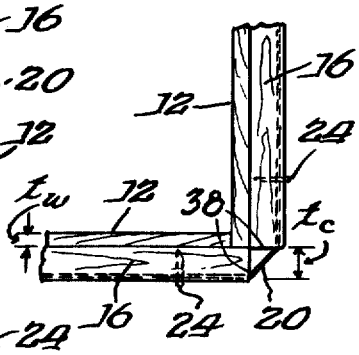
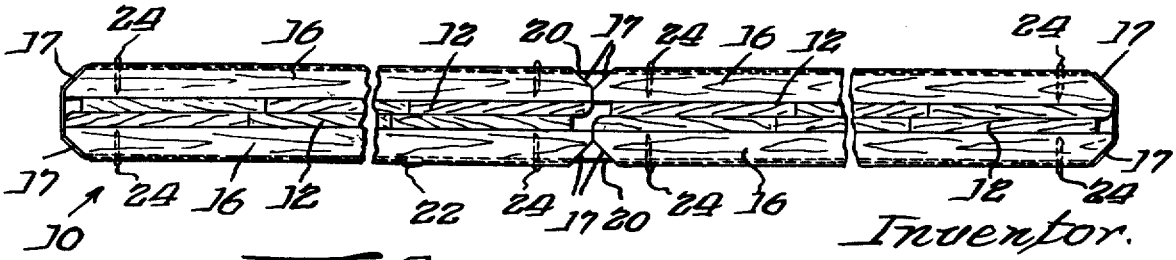
Fig. 4
Inventor.
Hershey I. Wait.
By Hume, Clement, Hume, & Lee.
Attys.

COLLAPSIBLE PALLET BOX

Matter enclosed in heavy brackets [ ] appears in the original patent but forms no part of this reissue specification; matter printed in italics indicates the additions made by reissue.

*This is a continuation of application Ser. No. 163,511, filed July 16, 1971, now abandoned.*

The present invention relates to collapsible containers, and more specifically to an improved collapsible pallet box.

A pallet box is used in conjunction with a pallet to transport loads with a fork lift. The box comprises four side walls which fit on top of the pallet in order to retain bulk materials. A disadvantage with pallet boxes presently available is that they take up a great deal of space in storage. Although some currently available boxes may be collapsed, this is a time-consuming procedure, often involving partial disassembly. Designs have been produced which do not require partial disassembly to collapse the box, but these boxes are generally complicated and expensive to produce.

Generally, the present invention relates to a collapsible pallet box of simple design which is relatively inexpensive to produce. The box is of generally rectangular configuration in plan when erected, and has four side walls as is conventional in the art. The side walls are each in lapped relationship with the ends of the adjacent side walls when the box is erected. Each of the side walls has a horizontal cleat secured to its exterior, so that there is at least one set of four such cleats which are aligned and extend the width of the side walls. Each cleat also extends over the ends of the lapped adjacent side walls so that, where necessary, it will extend beyond the end of the side wall to which it is attached a distance equal to the thickness of the adjacent side wall. Of course, where the side wall to which the cleat is attached overlaps the end of the adjacent side wall, this extension is not necessary. The cleats have aligned longitudinal channels, and an endless strap is slidably located in the channels, passing around the periphery of the box. The cleats are formed so that the strap will fit tightly around the box when it is in the erected position and also when the box is in the collapsed position.

The invention, both as to its organization and method of operation, together with the objects and advantages thereof, will be best understood by reference to the following detailed description taken together with the drawings in which:

FIG. 1 is an elevation view of a preferred embodiment of the present invention, partially cut away to show the manner in which the box fits over a pallet;

FIG. 2 is a plan view of the box shown in FIG. 1, also partially cut away;

FIG. 3 is a cross-sectional view taken along line 3—3 of FIG. 1;

FIG. 4 is a plan view of the pallet box of FIGS. 1 and 2 in collapsed position; and FIG. 5 is a fragmentary plan view of a second embodiment of the present invention.

FIG. 1 shows a pallet box constructed in accordance with the present invention and generally indicated by reference numeral 10. The pallet box comprises a set of four side walls 12, each made up of a plurality of adjacent vertical slats 14. Each of the side walls 12 has three horizontal cleats 16 secured to its outer side. Each of cleats 16 is a member of a set of four aligned cleats 16, one secured to each of the four side walls 12, as may be seen in FIG. 2. The cleats 16 are all of similar shape, and preferably have inwardly beveled ends 17.

Each of the cleats 16 has a longitudinal channel 18 running its entire length, with the exception of the beveled portion 17. These channels 18 in each set of four cleats 16 are aligned and carry an endless strap 20 running around the periphery of the box 10. In the embodiment shown, the strap 20 is conventional steel strapping, the ends of which are secured together by suitable fastening means 22. It will, of course, be understood that other strong, flexible materials may be used to form the strap 20. As shown in FIG. 3, although it is not essential, the strap 20 is preferably retained in the channel 18 by overlying staples 24. These staples 24 do not interfere with the sliding movement of the strap 20 in the channel 18.

Referring again to FIGS. 1 and 2, it will be seen that in the most preferred embodiment of the present invention each of the side walls 12 overlaps the end of one adjacent side wall indicated by reference numeral 12', and is overlapped by the end of the other adjacent side wall, indicated by reference numeral 12''. As may be seen from FIG. 2, when the box 10 is erected, this lapping relationship is true of each of the side walls 12. However, such an overlapping relationship is not essential to the present invention. In any event, each of the cleats 16 extends over the entire width of the side wall 12 to which it is attached, and also over the ends of the lapped adjacent side walls. It may therefore be seen that the length of each cleat is equal to $ID+2t_w$ where ID is the internal dimension of the box along the side wall to which the cleat is attached and $t_w$ represents the thickness of each adjacent side wall 12 at the lapped ends.

As shown in FIG. 1, the pallet box 10 of the present invention conveniently fits over a pallet, indicated generally by reference numeral 30. The pallet 30 comprises horizontal floor slats 32, the ends of which are secured to transverse supports 36. The floor slats 32 are thereby supported off the floor (not shown), so that the fork of a lift truck (not shown) may penetrate underneath the pallet 30 to lift and transport it. In the embodiment shown, the floor slats 32 of the pallet 30 are sized to fit within the side walls 12, while the box 10 rests upon the supports 36. However, it will be understood that many pallets and methods of securing a pallet box thereto are well known in the art, and it is not desired to limit the present invention to the particular construction shown.

Referring now to FIG. 4, the pallet box 10 of the present invention may be collapsed without any requirement for disassembly. Furthermore, the box in its collapsed position retains the proper relationship among the parts so that it may be very quickly and simply erected. Basic to the retention of the proper relationship among parts in both the collapsed and erected positions is the requirement that the strap 20 fit tightly in both the erected and collapsed positions, as may be seen from a comparison of FIGS. 2 and 4. When the box is collapsed the strap 20 will slide in the channel 18 to make up for the increased distance it must traverse at the ends of the collapsed box and the decreased distance it must traverse at the midpoint. It is thus an important feature of the present invention that the increase in distance at the ends when the box is :ollapsed be approximately equal to the decrease in listance at the midpoints. Of course, it is not essential hat these distances be precisely equal since it is ac-:eptable for the box to be slightly looser in either the ollapsed or erected position as compared to the other ıosition.

As may also be seen from FIG. 4, the inside vertical dges of the side walls 12 are rounded. This facilitates heir assuming the proper lapped orientation when the ıox is erected as shown in FIGS. 1 and 2.

FIG. 5 shows a second embodiment of the present ıvention wherein the cleats 16 have butt ends 38. In he case of a pallet box wherein the cleats have butt nds as shown in FIG. 5 the calculation of the proper imensional relationships between the cleats 16 and he side walls 12 is a relatively simple matter. Recalling hat it is desired that the strap 20 be tight in both the rected and collapsed positions, the following calcula-ıons may be made:

Where:

$t_w$=thickness of side walls;

$t_c$=thickness of cleat from outside surface of side wall to base of channel; and $L$=length of each channel.

Vhen erected, each strap must traverse the following istance:

$$4L+4t_c\sqrt{2}$$

Vhen collapsed the cleats will abut at the midpoint of ıe structure, and the distance the strap must span in ero. At each end the distance the strap must span is $t_c+2t_w$. So the total distance the strap must span is:

$$4L+4t_c+4t_w$$

:quating the distance the strap must span in erected nd collapsed positions:

$$4L+4t_c+4t_w=4L+4t_c\sqrt{2}$$

$$t_c+t_w=\sqrt{2}$$

$$t_w=0.4t_c$$

'hus, if the thickness of the side walls 12 is approxi-ıately equal to 0.4 time the thickness of the cleat, ıeasured to the bottom of the channel 18, the strap 20 'ill traverse approximately the same distance in both ıe erected and collapsed positions.

The above mathematical relationship is modified 'here beveled rather than butt ends are employed on ıe cleats, as shown in FIGS. 1–4. However, by varying ıe thickness of the cleat (measured to the bottom of ıe channel), it is possible to insure that the strap 20 'ill traverse approximately the same distance in both ıe erected and collapsed positions. A particular ad-antage of beveled ends on the cleats 16, as shown in ıe embodiment of FIGS. 1–4, is that they will not as :adily be worn down by the continuous sliding of the rap 20 as the box 10 is repeatedly erected and col-ıpsed.

I claim:

1. A collapsible pallet box comprising: four side walls ıch in lapped relationship with the ends of the adja-:nt side walls when said box is erected; a set of four igned horizontal cleats secured to the exterior of said de walls, each pair of said cleats being aligned in ıutting end-to-end relationship when said box is col-ıpsed, and each of said cleats extending the width of the side wall to which it is attached and beyond one end thereof a distance equal to the thickness of the adjacent side wall, and said cleats having aligned longitudinal channels; and an endless strap slidably located in said channels and passing around the periphery of said box, said strap fitting tightly around said box when said box is in erected and collapsed positions.

2. The pallet box as defined in claim 1 wherein said box includes a first and second set of cleats, said first set positioned adjacent to the top of said side walls and said second set positioned adjacent to the bottom of said side walls.

3. A collapsible pallet box comprising: four side walls each in lapped relationship with the ends of the adjacent side walls when said box is erected; a set of four aligned horizontal cleats secured to the exterior of said side walls, said cleats extending the width of said side walls and over the ends of said lapped adjacent side walls, the length of each cleat being equal to the internal horizontal dimension of said box along the side wall to which said cleat is attached plus twice the thickness of said side walls and said cleats having aligned longitudinal channels; and an endless strap slidably located in said channels and passing around the periphery of said box, said strap fitting tightly around said box when said box is in erected and collapsed positions.

4. The pallet box as defined in claim 3 wherein one of each adjacent pair of inside vertical edges of said side wall is rounded to facilitate overlapping when said box is set up.

5. The pallet box as defined in claim 3 wherein said strap is retained in said channels by overlying staples.

6. The pallet box as defined in claim 3 wherein the ends of said cleats are inwardly beveled.

7. A collapsible pallet box comprising: four side walls, each side wall overlapping the end of one adjacent side wall and overlapped by the end of the other adjacent side wall when said box is erected; a first and second set of four aligned horizontal cleats secured to the exterior of said side walls, said first set positioned adjacent to the top of said side walls and said second set positioned adjacent to the bottom of said side walls, each pair of cleats in each of said sets being aligned in abutting end-to-end relationship when said box is collapsed, said cleats each extending the width of the side wall to which it is attached and beyond one end thereof a distance equal to the thickness of the adjacent side wall, and said cleats having aligned longitudinal channels; and an endless strap for each set of cleats, said strap slidably located in said channels and passing around the periphery of said box, said strap fitting tightly in said channels when said box is in erected and collapsed positions.

8. A collapsible pallet box comprising: four side walls, each side wall overlapping the end of one adjacent side wall and overlapped by the end of the other adjacent side wall when said box is erected; a first and a second set of four aligned horizontal cleats secured to the exterior of said side walls, said first set positioned adjacent to the top of said side walls and said second set positioned adjacent to the bottom of said side walls, said cleats each extending the width of said side walls and over the ends of said lapped adjacent side walls, the length of each cleat being equal to the internal horizontal dimension of the box along the side wall to which it is attached plus twice the thickness of said side walls, and said cleats having aligned longitudinal channels; and an endless strap for each set of cleats, said strap slidably located in said channels and passing around the periphery of said box, said strap fitting tightly in said channels when said box is in erected and collapsed positions.

9. The pallet box as defined in claim 8 wherein one of each adjacent pair of inside vertical edges of said side walls is rounded to facilitate overlapping when said box is set up.

10. The pallet box as defined in claim 9 wherein said strap is retained in said channels by overlying staples.

11. The pallet box as defined in claim 9 wherein the ends of said cleats are inwardly beveled.

*12. A collapsible pallet container comprising four side walls each formed of vertically extending slots, said side walls having inner and outer faces and first and second opposed vertical edges; the vertical edges of the adjacent side walls being in lapped relationship when the container is in the erected position with said first vertical edge of each side wall in end abutting relation with the inner face of an adjacent side wall adjacent the second vertical edge of said adjacent side wall, two sets of four aligned horizontal cleats secured to the outer faces of said side walls said cleats each having a length which is equal to the length of the side wall to which it is secured plus the approximate thickness of the side wall slats, one of said sets being positioned adjacent the top of said side wall and the other of said sets being positioned adjacent the bottom of said side walls with the end of one of the two adjacent cleats at each corner of said container being*

*aligned with the adjacent second vertical edge of the side wall to which said cleat is attached and with the end of the other adjacent cleat at said corner extending beyond the first vertical edge of the side wall to which said cleat is attached a distance approximately equal to the thickness of said slats, whereby, when the container is in the erected position, the second edge of one of the two adjacent slats at each corner overlaps the first edge of the other adjacent slat with its inner face engaged with the first vertical edge of said adjacent slat and the adjacent ends of the cleats in each of said sets are contiguous but non-overlapping and, when the container is collapsed, alternate pairs of adjacent cleat ends in each of said sets come into end abutting relationship, a pair of endless flexible metal straps, each extending around said container parallel to and overlying one of said sets of cleats, the circumference of said straps being such that said straps fit substantially tightly around said container in both the erected and collapsed positions, said cleats including means for laterally retaining said straps on the cleats while permitting longitudinal movement thereof as the container is moved between the erected and collapsed positions.*

*13. A container as defined in claim 12 wherein said cleats are butt-ended and wherein said slats have a thickness not exceeding approximately 0.4 times the thickness of said cleats.*

* * * * *